(12) United States Patent
Teramoto

(10) Patent No.: US 6,898,497 B2
(45) Date of Patent: May 24, 2005

(54) MOTOR DRIVING CONTROLLER IN ELECTRIC POWER STEERING APPARATUS

(75) Inventor: Tomoaki Teramoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/440,336

(22) Filed: May 16, 2003

(65) Prior Publication Data

US 2004/0019419 A1 Jan. 29, 2004

(30) Foreign Application Priority Data

Jul. 26, 2002 (JP) ........................................ 2002-218239

(51) Int. Cl.[7] ............................ H02M 3/07; B62D 5/04
(52) U.S. Cl. ............................ 701/41; 701/42; 180/446
(58) Field of Search ...................... 701/41, 42; 180/443, 180/446

(56) References Cited

U.S. PATENT DOCUMENTS 6,502,024 B2 * 12/2002 Ishihara et al. ............... 701/41
6,639,379 B2 * 10/2003 Matsushita et al. .......... 318/727
6,727,669 B2 * 4/2004 Suzuki et al. ................ 318/139

FOREIGN PATENT DOCUMENTS

JP 2002035992 A 2/2002

* cited by examiner

Primary Examiner—Michael J. Zanelli
(74) Attorney, Agent, or Firm—Merchant & Gould P.C.

(57) ABSTRACT

Electric power steering apparatus includes a steering torque detection section for detecting steering torque acting on a steering system, a motor for imparting steering assist torque to the steering system; a voltage raising circuit including a switching element to be driven by a voltage-raise controlling PWM signal; and a motor driving controller for setting a target current to be supplied to the motor on the basis of at least the detected steering torque, setting a motor-current controlling duty factor signal on the basis of the target current, operating a switching circuit on the basis of the duty factor signal to control a motor drive current, and driving the motor with the controlled current. CPU of the motor driving controller generates the PWM signal for controlling the voltage raising circuit.

4 Claims, 6 Drawing Sheets

MOTOR DRIVING CONTROLLER IN ELECTRIC POWER STEERING APPARATUS

FIELD OF THE INVENTION

The present invention relates generally to electric power steering apparatus, and more particularly to an improved motor driving controller in an electric power steering apparatus which, by means of its CPU, generates PWM (Pulse Width Modulated) signals to be supplied to a voltage raising circuit provided in an electric system of the steering apparatus.

As well known, the electric power steering apparatus are steering force assisting apparatus which are designed to activate an electric motor (steering assisting motor) as a human operator or driver manually operates the steering wheel, during driving of a motor vehicle, to thereby assist the manual steering force. In such electric power steering apparatus, the steering assisting motor is controlled by a motor control section, on the basis of a steering torque signal generated by a steering torque detection section detecting steering torque that is produced on the steering shaft by driver's operation of the steering wheel and a vehicle velocity signal generated by a vehicle velocity detection section detecting a traveling velocity of the vehicle, so as to reduce manual steering force to be applied by the human driver. Specifically, to control the steering assisting motor, the motor control section sets a target value of a motor drive current to be supplied to the motor on the basis of the above-mentioned steering torque signal and vehicle velocity signal, and then it calculates a difference or offset between the thus-set target current value and a value of a motor drive current signal fed back from a motor current detection section that detects a motor drive current to be actually supplied to the motor. Then, the motor control section performs a proportional/integral compensating process (PI control) on an offset signal representative of the calculated offset, to thereby generate a signal for controlling driving of the steering assisting motor.

Generally, the electric power steering apparatus include a voltage raising circuit in its electric system, so as to supply the steering assisting motor with a voltage raised to a given level. In FIG. 6, there is shown an example of the voltage raising circuit proposed by the assignee of the present application in Japanese Patent Application No. 2002-35992 (filed on Feb. 13, 2002), which has not yet been laid open. In FIG. 6, the voltage raising circuit 100 includes a coil 102 and two FETs (Field Effect transistors) 103, 104 connected to the input side of an earth line 101 and a capacitor 105 connected to the output side of the earth line 101, and the coil 102, FETs 103, 104 and capacitor 105 are coupled together by a π-shaped connection as illustrated. Once a voltage Vin is supplied to an input terminal 100a of the voltage raising circuit 100, a raised voltage Vout is produced from an output terminal 100b of the voltage raising circuit 100. Namely, in the voltage raising circuit 100, PWM signals SG11 and SG12 each having a given duty factor are applied to the respective gates of the two FETs 103 and 104, so that the voltage can be raised in level on the basis of repeated charging operations of the capacitor 105 to thereby produce the raised output voltage Vout. The raised output voltage Vout from the output terminal 100b is used as a motor driving voltage.

FIG. 7 shows an example of a conventional motor-driving-voltage raising section of an electric power steering apparatus, which employs the voltage raising circuit 100. In the conventional motor-driving-voltage raising section, the output voltage from the voltage raising circuit 100 is supplied via a motor drive circuit 111 to the steering assisting motor 112 of the electric power steering apparatus. Reference numeral 113 represents a PWM signal generation circuit for generating the PWM signals to be applied to the voltage raising circuit 100. A portion of the output voltage from the voltage raising circuit 100 is extracted by voltage division, and the thus-extracted voltage is fed back to the PWM signal generation circuit 113 by way of a two-input comparator 114 that is an output-difference amplifier. Reference voltage from a reference voltage source 115 is applied to the other input of the comparator 114. Namely, in the motor-driving voltage raising section thus arranged, the output voltage from the voltage raising circuit 100 is divided, so that a portion of the output voltage is fed back for comparison, by the comparator 114, to the reference voltage from the reference voltage source 115. The voltage difference output from the comparator 114 is passed to the PWM signal generation circuit 113 where a duty factor of the PWM signal waveforms is determined.

Note that FIG. 7 mainly illustrates only the voltage raising section dedicated to the steering assisting motor 112 with illustration of the above-mentioned motor control section (including a CPU, memory, etc.) of the electric power steering apparatus omitted.

Generally, in the electric power steering apparatus including the voltage raising circuit in its electric system, the voltage raising operation is implemented by controlling the ON/OFF states of the two FETS provided in the voltage raising circuit, and thus it is necessary to supply PWM signals to the voltage raising circuit. To this end, it has been conventional to generate dedicated voltage-raising PWM signals by means of a dedicated PWM-signal generating electronic device that is in the form of an IC designed solely for the voltage raising operation. Such a conventional technique, however, would invite an undesired increase in manufacturing cost of the electric power steering apparatus and require an extra mounting space for hardware electronic components.

SUMMARY OF THE INVENTION

In view of the foregoing prior art problems, it is an object of the present invention to provide a motor driving controller in an electric power steering apparatus which can raise a motor driving voltage without a PWM-signal generating electronic device dedicated to the voltage raising circuit, which can simplify the construction of electronic sections of the apparatus, which can reduce manufacturing cost of the apparatus, and which can minimize a necessary mounting space for hardware electronic components of the apparatus.

In order to accomplish the above-mentioned object, the present invention provides an electric power steering apparatus, which comprises: a steering torque detection section for detecting steering torque acting on a steering system of a vehicle and generating a steering torque signal indicative of the detected steering torque; steering assisting a motor for imparting steering assist torque to the steering system; a voltage raising circuit including a switching element to be driven by a voltage-raise-controlling PWM signal; and a motor driving controller for setting a target current to be supplied to the motor on the basis of at least the steering torque signal, setting a motor-current controlling duty factor signal on the basis of the target current, operating a switching circuit on the basis of the duty factor signal to control a motor drive current, and driving the motor with the controlled motor drive current. In the present invention, the motor driving controller includes a CPU (Central Processing Unit), and this CPU generates the PWM signal and controls the voltage raising operation of the voltage raising circuit with the generated PWM signal.

In the present invention, the voltage-raise controlling PWM signal is generated by computer software executed by the CPU of the motor driving controller included in the electric power steering apparatus. Thus, the present invention can eliminate the need for provision of a controller and hardware electronic components dedicated to the voltage raising operation, and the present invention can effectively reduce the manufacturing cost of the electric power steering apparatus and the necessary mounting space for hardware electronic components.

In a preferred embodiment, the CPU of the motor driving controller includes a data conversion section for generating the voltage-raise controlling PWM signal on the basis of a voltage signal output from the voltage raising circuit. Namely, the voltage-raise controlling PWM signal is generated by performing feedback control of the raised voltage output from the voltage raising circuit. More specifically, the raised voltage, output from the voltage raising circuit on the basis of a duty factor of the voltage-raise controlling PWM signal generated by the CPU, is converted by an A/D converter into digital representation to be read by the CPU, and a duty factor of a voltage-raise controlling PWM signal to be subsequently generated is determined in accordance with the converted digital voltage value and fed back to a PWM signal generation section of the CPU. In this manner, the present invention permits generation of high-accuracy voltage-raise controlling PWM signals.

In another preferred embodiment, the CPU of the motor driving controller may include a generation section for generating the PWM signal on the basis of a predicting table using the target current calculated by a target current calculation section of the controller. In this case, the voltage-raise controlling PWM signal is generated by performing prediction-based feed-forward control. With such arrangements, the present invention can eliminate necessity for the CPU to read raised voltages from the voltage raising circuit and perform arithmetic operations at a high frequency. Thus, the present invention allows the motor controller of the electric power steering apparatus to be also used for generation of voltage-raise controlling PWM signals, without requiring an upgrade of the performance of the CPU.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

It should be appreciated that various construction, shapes, sizes, positions, etc. to be referred to in the following description are merely for illustrative purposes to enable those of ordinary skill in the art to understand and carry out the present invention. Therefore, the present invention should never be construed as restricted to embodiments to be described hereinbelow, and it may be modified variously without departing from the scope defined by the appended claims.

Figure 1:
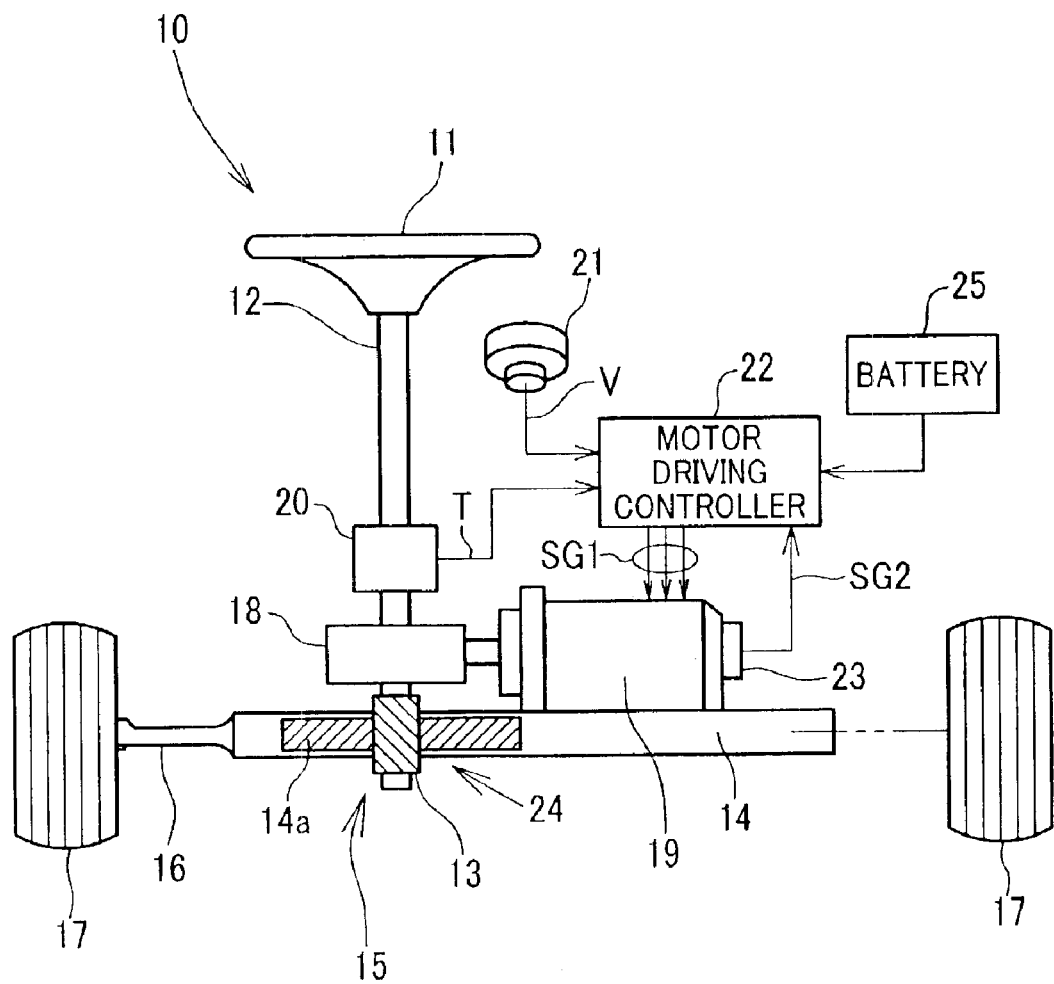
FIG. 1 is a view schematically showing a general setup of an electric power steering apparatus of the present invention.

First, with reference to FIGS. 1 to 3, a description will be given about a general setup of an electric power steering apparatus of the present invention and characteristic features of a first embodiment of the present invention.

The electric power steering apparatus 10 of the present invention is used in a motor vehicle, as a passenger car. The electric power steering apparatus 10 is constructed to impart steering assist torque to a steering shaft 12 connected to a steering wheel 11. The steering shaft 12 has an upper end connected to the steering wheel 11 and a lower end connected to a pinion gear 13. The pinion gear 13 meshes with a rack gear 14a formed on a rack shaft 14. The pinion gear 13 and rack gear 14a together constitute a rack and pinion mechanism 15. Tie rods 16 are connected to opposite ends of the rack shaft 14, and a front road wheel 17 is connected to the outer end of each of the tie rods 16.

Steering assisting motor 19, which is, for example, a brushless motor, is connected via a power transmission mechanism 18 to the steering shaft 12. The motor 19 produces rotational force (torque) to assist manual steering torque applied by a human driver of the vehicle and imparts the thus-produced rotational force to the steering shaft 12 via the power transmission mechanism 18. Steering torque detection section 20, which is attached to the steering shaft 12, detects the steering torque produced on the steering shaft 12 by the vehicle driver operating the steering wheel 12, and a vehicle velocity detection section 21 detects a traveling velocity of the vehicle. Reference numeral 22 is a motor driving controller that is implemented by a computer system including a CPU, memory etc.; for example, the computer system may use a microcomputer. The motor driving controller 22 receives a steering torque signal T from the steering torque detection section 20, a vehicle velocity signal from the vehicle velocity detection section 21, etc., on the basis of which it generates a driving control signal SG1 for controlling the rotation of the steering assisting motor 19. Rotational angle detection section 23, attached to the steering assisting motor 19, detects a rotational angle (electrical angle) of the motor 19 and generates a signal SG2 indicative of the detected rotational angle, and the rotational angle signal SG2 is fed to the controller 22. The above-mentioned rack and pinion mechanism 15 etc. are accommodated together in a gearbox 24. The controller 22 is supplied with electric power by a battery 25 that is a D.C. power source mounted on the vehicle or a D.C. power supply section constructed to output a given voltage extracted, by voltage division, from the D.C. power source.

The electric power steering apparatus 10 is constructed by adding, to the conventional steering-related components, the steering torque detection section 20, vehicle velocity detection section 21, motor driving controller 22, steering assisting motor 19 and power transmission mechanism 18.

As the driver operates the steering wheel 11, during travel of the vehicle, to control a traveling direction of the vehicle, the rotational force based on the manual steering torque applied to the steering shaft 12 is converted, via the rack and pinion mechanism 15, into linear force to axially move the rack shaft 14 and thereby change the direction of the front road wheels 17 via the tie rods 16. At that time, the steering torque detection section 20 attached to the steering shaft 12 detects the steering torque based on the driver's manual steering operation of the steering wheel to generate an electrical steering torque signal T indicative of the detected steering torque, and it outputs the steering torque signal T to the controller 22. Also, the vehicle velocity steering detection section 21 detects a traveling velocity of the vehicle to generate a vehicle velocity signal V indicative of the detected vehicle velocity, and it outputs the vehicle velocity signal V to the motor driving controller 22. In turn, the motor driving controller 22 generates a motor drive current for driving the motor 19, on the basis of the steering torque signal T and vehicle velocity signal V. The motor driving motor 19 is driven by the motor drive current to produce steering assist torque that acts on the steering shaft 12 via the power transmission mechanism 18. The steering assisting motor 19 driven in this way can significantly reduce the steering force to be applied by the human driver to the steering wheel 11.

Figure 2:
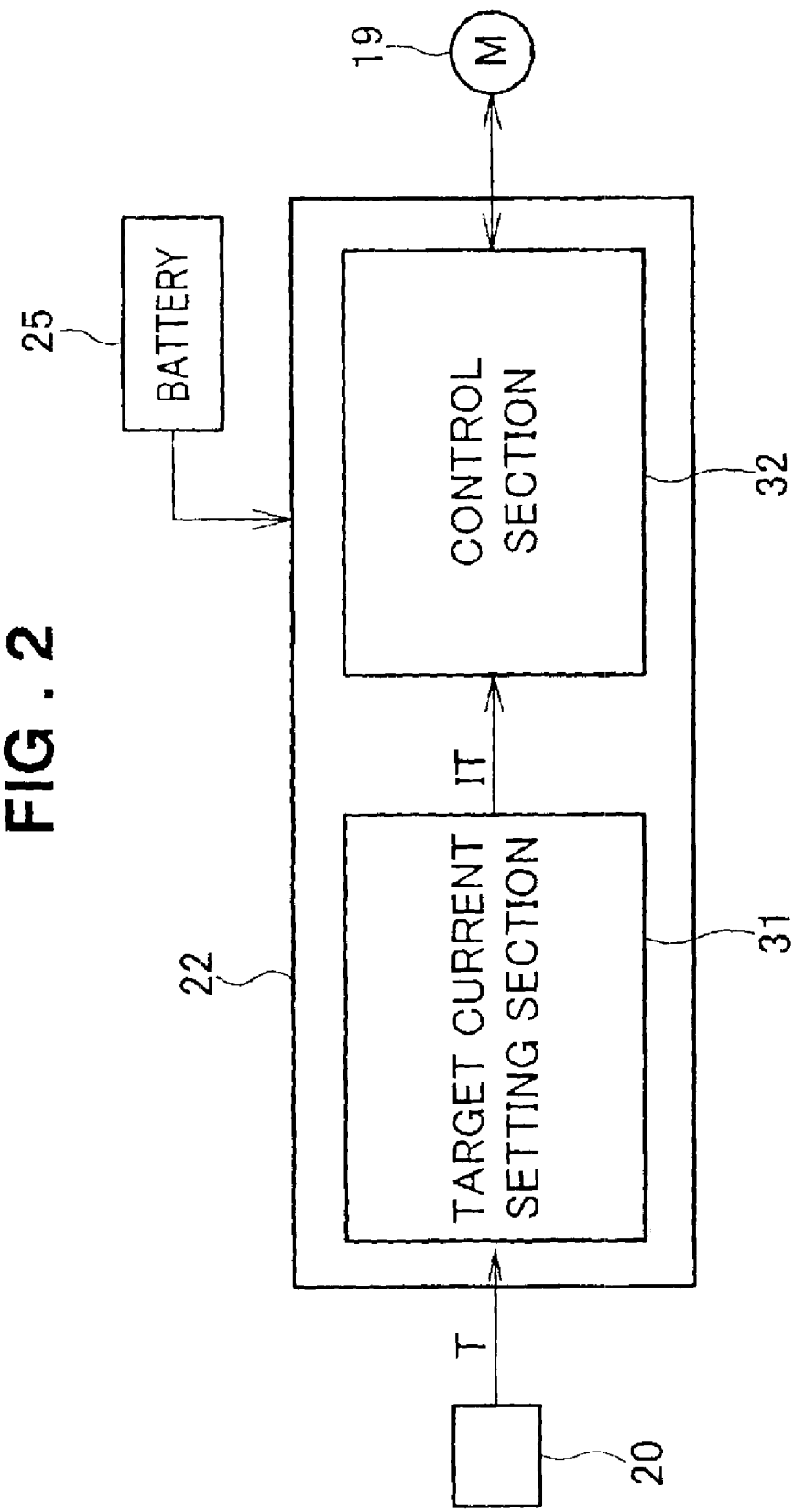
FIG. 2 is a block diagram showing a construction of a motor driving controller in the electric power steering apparatus of FIG. 1.

Broadly stated, the motor driving controller 22 comprises a target current setting section 31 and a control section 32, as illustrated in FIG. 2.

The target current setting section 31 determines target steering assist torque mainly on the basis of the steering torque T and generates a target current signal IT indicative of a value of a target current necessary for the motor 19 to supply the target steering assist torque.

Figure 3:
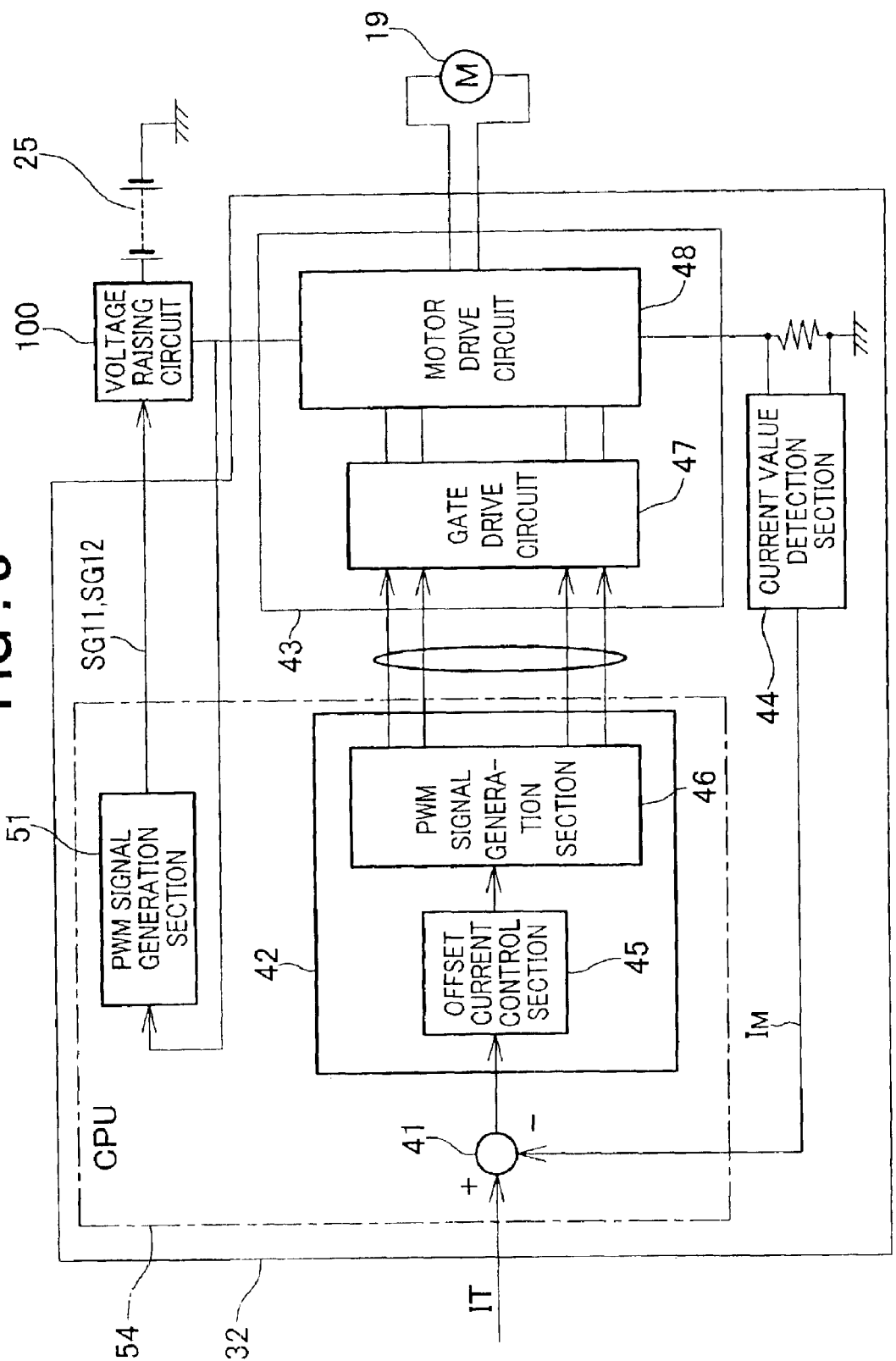
FIG. 3 is a block diagram showing a detailed construction of the motor driving controller in the electric power steering apparatus in accordance with a first embodiment of the present invention.

Detailed structure of the control section 32 is illustrated in FIG. 3. The control section 32 includes, as motor-drive-current controlling components, an offset calculation section 41, a motor control section 42, a motor drive section 43, and a current value detection section 44. The offset calculation section 41 calculates an offset between the value indicated by the target current signal IT and an actual motor drive current value ($I_M$) detected by the current value detection section 44. The motor control section 42 includes an offset current control section 45 and a PWM signal generation section 46. On the basis of the offset current signal given from the offset calculation section 41, the offset current control section 45 generates a driving current signal for controlling the motor drive current. The PWM signal generation section 46 generates PWM signals for PWM-operating the steering assisting motor 19, on the basis of the driving current signal given from the offset current control section 45. The motor drive section 43 includes a gate drive circuit 47 and a motor drive circuit 48. The motor drive circuit 48 is an H-shape bridge circuit constructed with four FETs, and it corresponds to the motor drive circuit 111 in the above-described conventional apparatus. The gate drive circuit 47 selectively switches on/off the FETs of the motor drive circuit 48, on the basis of the driving control signal (PWM) signal.

With the above arrangements, the controller 22 PWM-controls the motor drive current, to be supplied from the battery 25 to the steering assisting motor 19, by means of the motor drive circuit 48 on the basis of the steering torque detected by the steering torque detection section 20, so as to control the power (steering assist torque) to be output from the motor 19.

Voltage raising circuit 100, similar to the one described earlier in relation to the conventional apparatus, is connected between the battery 25 and the motor drive circuit 48 of the control section 32. The voltage raising circuit 100 includes two FETs to perform a voltage raising operation by being driven by the PWM signals. With the thus-arranged voltage raising circuit 100, the voltage supplied by the battery 25 is raised to a given level, so that the thus-raised voltage is delivered from the voltage raising circuit 100 to the motor drive circuit 48.

Further, the control section 32 includes, as a component for controlling the motor-drive-current supplying electric system, a voltage-raising PWM signal generation (second PWM signal generation) section 51 in addition to the above-mentioned PWM signal generation (first PWM signal generation) 46. The voltage signal output from the voltage raising circuit 100 is extracted by voltage division and fed back to the PWM signal generation section 51, so that the generation section 51 generates voltage-rise controlling PWM signals SG11 and SG12 of a given duty factor on the basis of the fed-back voltage signal. The voltage-rise controlling PWM signals SG11 and SG12 thus generated by the PWM signal generation section 51 are supplied to the voltage raising circuit 100.

Figure 4:
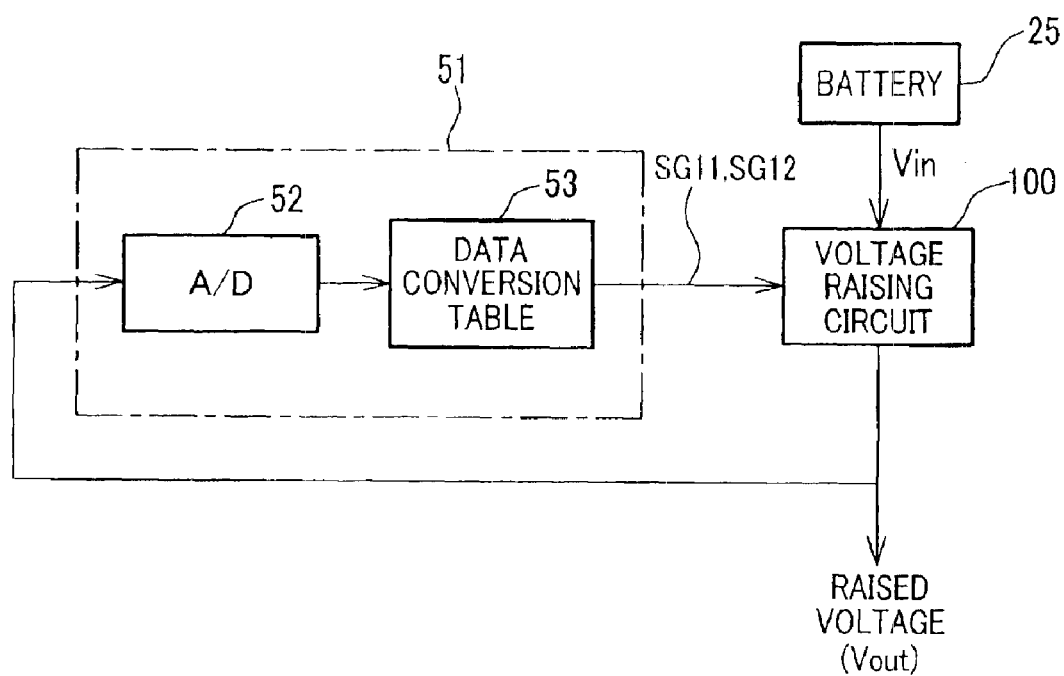
FIG. 4 is a block diagram showing an example construction of a voltage-raising PWM signal generation section of the motor driving controller.

FIG. 4 shows an example detailed construction of the PWM signal generation section 51. As shown, the PWM signal generation section 51 includes an A/D converter 52 and a data conversion table 53. Normally, the raised voltage (Vout) output from the voltage raising circuit 100 is input to the A/D converter 52 at a given level, where it is converted from analog representation to digital representation. The data conversion table 53 is looked up to determine a particular duty factor corresponding to the value of the raised voltage output from the voltage raising circuit 100. The PWM signal generation section 51 generates the voltage-raising controlling PWM signals SG11 and SG12 using the duty factor determined via the data conversion table 53.

In the instant embodiment, the PWM signal generation section 51 is implemented by computer software executed by the CPU 54 that performs primary functions of the control section 32 in the electric power steering apparatus as illustrated in FIG. 3. The data conversion table 53 is pre-stored in a memory attached to the CPU 54. Thus, the PWM signal generation section 51, functioning as a component for controlling the motor-drive-current supplying electric system, is constructed within the CPU 54 of the electric power steering apparatus 10.

It should be appreciated that the data conversion table 53 of the PWM signal generation section 51 may be replaced by an arithmetic operation section performing arithmetic operations to determine the above-mentioned duty factor.

Namely, the above-described first embodiment of the present invention is characterized in that PWM signals for driving the voltage raising circuit 100 are generated in accordance with the computer software executed by the CPU 54 of the motor driving controller 22 of the electric power steering apparatus 10 and on the basis of feedback control performed by the CPU 54. Thus, the first embodiment of the motor driving controller can eliminate the need for provision of a dedicated controller for generating voltage-raising PWM signals.

Figure 5:
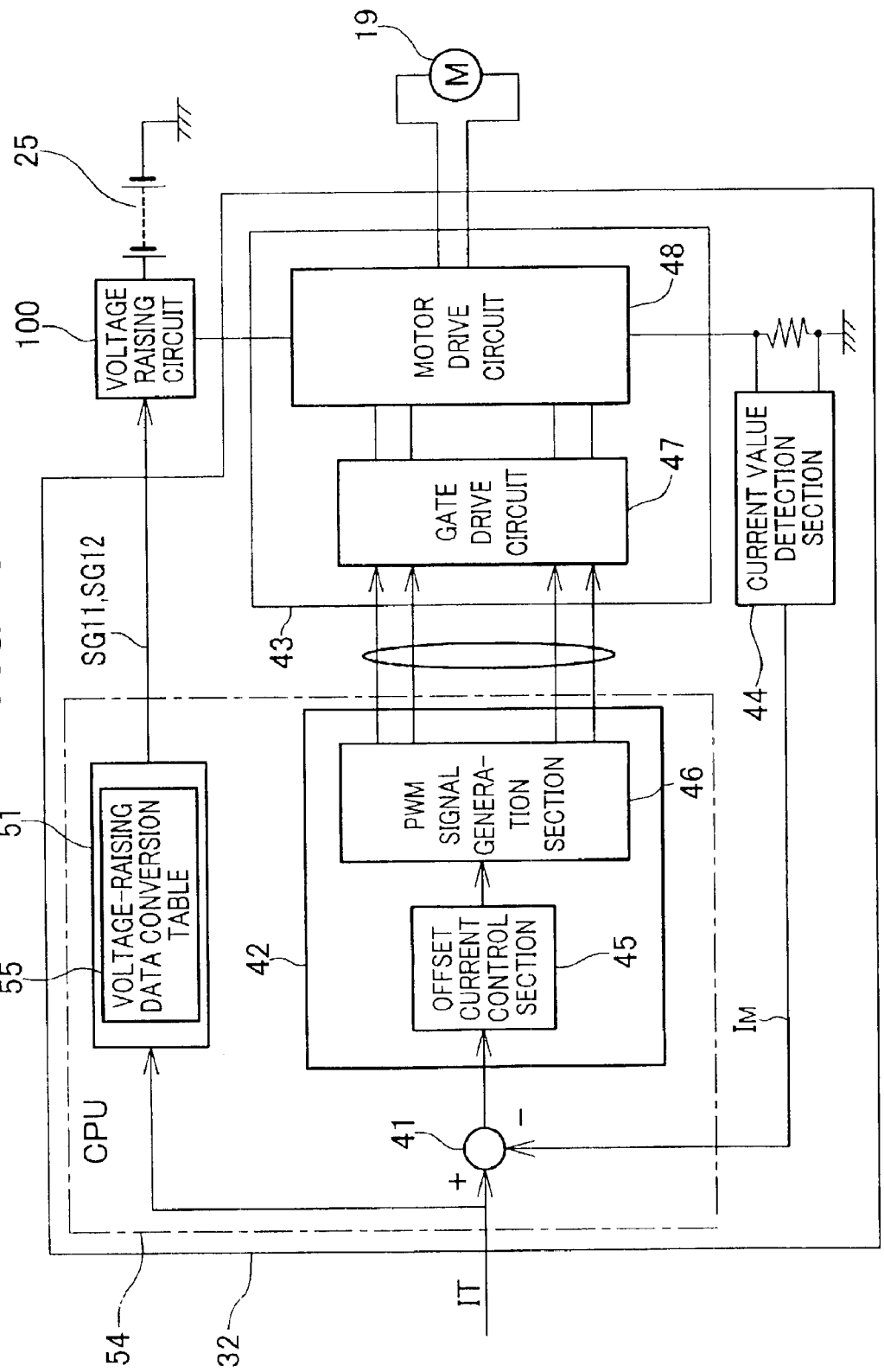
FIG. 5 is a block diagram, similar to FIG. 3, showing an example construction of a voltage-raising PWM signal generation section in accordance with a second embodiment of the present invention.
Figure 6:
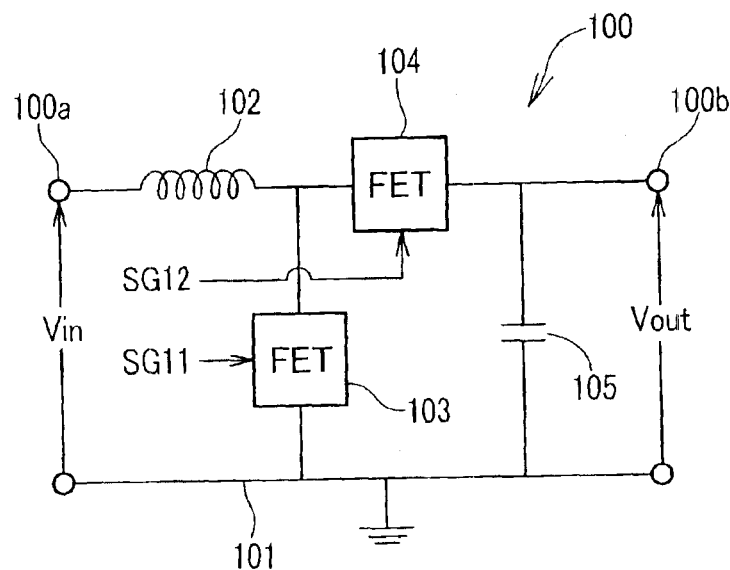
FIG. 6 is a circuit diagram of a conventional voltage raising circuit including two FETS.
Figure 7:
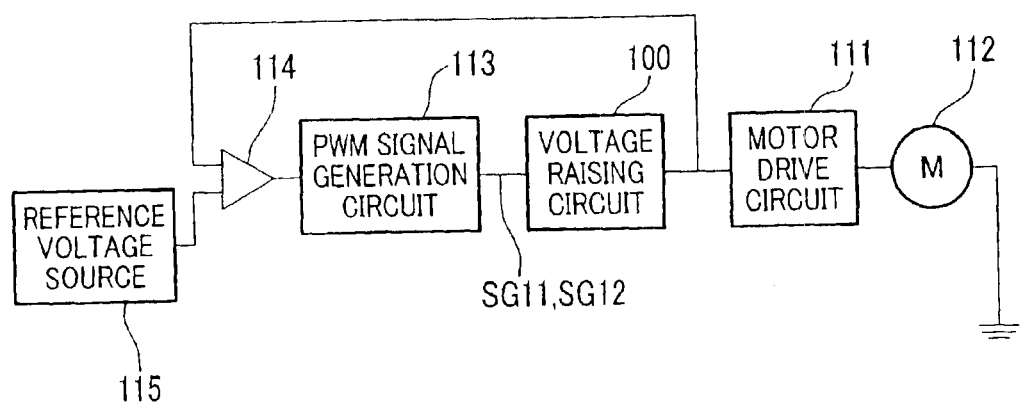
FIG. 7 is a block diagram of a conventional voltage-raise driving section for driving the voltage raising circuit of FIG. 6.

Next, a description will be given about a second embodiment of the present invention, with reference to FIG. 5 that corresponds to FIG. 3 showing the first embodiment of the invention. According to the second embodiment, the CPU 54 of the motor driving controller 22 of the electric power steering apparatus 10 implements the PWM signal generation section 51 on the basis of other control principles than those having been described earlier in relation to the first embodiment. The PWM signal generation section 51 in the second embodiment includes a voltage-raising data conversion table 55 to be looked up for generating voltage-raising PWM signals SG11 and SG12 on the basis of the target current signal IT generated by the target current setting section 31. The voltage-raising data conversion table 55 is a predicting table for predicting a duty factor on the basis of the target current value so that PWM signals are generated on the basis of the predicted duty factor. In the second embodiment, the PWM signal generation section 51 of the motor driving controller 22 is generally similar in construction to the PWM signal generation section 51 in the first embodiment, but different therefrom in that it is constructed on the basis of feed-forward control rather than feedback control.

In the second embodiment, voltage-raising PWM signals are generated on the basis of feed-forward control using the target current value determined by the target current setting section of the electric power steering apparatus, and voltage raising control is performed on the basis of the voltage-raising PWM signals. With such arrangements, the second embodiment can effectively reduce the loads on the CPU 54; therefore, the second embodiment can perform high-accuracy control of the voltage raising operation without having to use a high-performance CPU.

In summary, the present motor is characterized in that the voltage-raising PWM signal generation section is implemented by computer software executed by the CPU of the electric power steering apparatus including, in its electric system, the voltage raising circuit driven by PWM signals. With such novel arrangements, the present invention can raise the motor driving voltage without a PWM-signal generating electronic device dedicated to the voltage raising circuit, can simplify the construction of electronic sections of the electric power steering apparatus thereof, can manufacture the steering apparatus at reduced cost, and can reduce a necessary mounting space for hardware electronic components of the apparatus.

Further, the voltage-raising PWM signal generation section constructed by the CPU using the feed-forward control can effectively reduce the loads on the CPU. As a result, the present invention can perform high-accuracy control of the voltage raising operation without having to use a high-performance CPU.

The present disclosure relates to the subject matter of Japanese Patent Application No. 2002-218239, filed Jul. 26, 2002, the disclosure of which is expressly incorporated herein by reference in its entirety.

What is claimed is:

1. An electric power steering apparatus comprising:
 a steering torque detection section for detecting steering torque acting on a steering system of a vehicle and generating a steering torque signal indicative of the detected steering torque;
 a motor for imparting steering assist torque to the steering system;
 a motor driving controller for setting a target current to be supplied to said motor on the basis of at least the steering torque signal, setting a motor-current controlling duty factor signal on the basis of the target current, operating a switching circuit on the basis of the duty factor signal to control a motor drive current, and driving said motor with the controlled motor drive current,
 said motor driving controller including a control section having a motor drive circuit for driving the motor with the controlled motor drive current; and
 a voltage raising circuit for raising a voltage to a given level to be supplied to the motor drive circuit, the voltage raising circuit including a switching element to be driven by a voltage-raise controlling PWM signal,
 wherein the control section of the motor drive controller further includes a CPU, said CPU generating the voltage-raise controlling PWM signal for controlling said voltage raising circuit, and
 wherein said CPU of said motor driving controller includes data conversion means for, on the basis of a voltage signal output by and fed back from said voltage raising circuit, generating the voltage-raise controlling PWM signal for controlling said voltage raising circuit.

2. An electric power steering apparatus comprising:
 a steering torque detection section for detecting steering torque acting on a steering system of a vehicle and generating a steering torque signal indicative of the detected steering torque;
 a motor for imparting steering assist torque to the steering system;
 a motor driving controller for setting a target current to be supplied to said motor on the basis of at least the steering torque signal, setting a motor-current controlling duty factor signal on the basis of the target current, operating a switching circuit on the basis of the duty factor signal to control a motor drive current, and driving said motor with the controlled motor drive current,
 said motor driving controller including a control section having a motor drive circuit for driving the motor with the controlled motor drive current; and
 a voltage raising circuit for raising a voltage to a given level to be supplied to the motor drive circuit, the voltage raising circuit including a switching element to be driven by a voltage-raise controlling PWM signal,
 wherein the control section of the motor drive controller further includes a CPU, said CPU generating the voltage-raise controlling PWM signal for controlling said voltage raising circuit, and
 wherein said CPU of said motor driving controller includes means for generating the voltage-raise controlling PWM signal on the basis of a predicting table using the target current.

3. An electric power steering apparatus comprising:
 a steering torque detection section for detecting steering torque acting on a steering system of a vehicle and generating a steering torque signal indicative of the detected steering torque;
 a motor for imparting steering assist torque to the steering system;
 a motor driving controller for setting a target current to be supplied to said motor on the basis of at least the steering torque signal, setting a motor-current controlling duty factor signal on the basis of the target current, operating a switching circuit on the basis of the duty factor signal to control a motor drive current, and driving said motor with the controlled motor drive current, said motor driving controller including a target current setting section for setting the target current and a control section including a motor driver circuit for driving the motor with the controlled motor drive current; and a voltage raising circuit for raising a voltage to a given level to be supplied to the motor drive circuit, the voltage raising circuit including a switching element to be driven by a voltage-raise controlling PWM signal, wherein the control section further includes a CPU, said CPU including a PWM signal generation section directly connected to the target current setting section to generate, on the basis of a target current signal supplied directly from the target current setting section, the voltage-raise controlling PWM signal for controlling said voltage raising circuit.

4. An electric power steering apparatus as claimed in claim 3, wherein said CPU of said motor driving controller includes means for generating the voltage-raise controlling PWM signal on the basis of a predicting table using the target current.

* * * * *